United States Patent [19]
Harada et al.

[11] 4,121,006
[45] Oct. 17, 1978

[54] COATED POLYOLEFIN FILM

[75] Inventors: Yuichi Harada; Tetsuo Ishihara; Shigeyuki Takahashi, all of Amagasaki, Japan

[73] Assignee: Daicel Ltd., Sakai, Japan

[21] Appl. No.: 715,380

[22] Filed: Aug. 18, 1976

[30] Foreign Application Priority Data

Aug. 25, 1975 [JP] Japan ................... 50/102796

[51] Int. Cl.² .............................................. B32B 3/00
[52] U.S. Cl. ................................... 428/172; 428/336;
428/515; 428/518; 428/910; 260/29.6 XA;
526/317; 427/407 E; 427/385 B; 426/127;
206/484.1
[58] Field of Search ............... 428/518, 515, 336, 910,
428/172; 260/29.6; 526/317; 427/407, 385

[56] References Cited
U.S. PATENT DOCUMENTS

| 3,334,077 | 8/1967 | Gateff | 526/317 X |
| 3,353,992 | 11/1967 | Grenley et al. | 428/520 |
| 3,361,587 | 1/1968 | Menikheim et al. | 117/47 |
| 3,374,197 | 3/1968 | England | 260/29.6 |
| 3,695,922 | 10/1972 | Chujo et al. | 428/336 |
| 4,038,449 | 7/1977 | Uemura et al. | 428/518 X |

Primary Examiner—P. C. Ives
Attorney, Agent, or Firm—Blanchard, Flynn, Thiel, Boutell & Tanis

[57] ABSTRACT

A polyolefin film is coated with an undercoat consisting essentially of a mixture of (a) polyvinylidene chloride or a copolymer thereof containing at least 88 percent by weight of vinylidene chloride monomer units and (b) a chlorinated polypropylene or a graft polymer thereof; at the weight ratio of a/b in the range between 99/1 and 90/10, and a topcoat consisting essentially of a vinylidene chloride copolymer containing not more than 88 percent by weight of vinylidene chloride monomer units.

9 Claims, 1 Drawing Figure

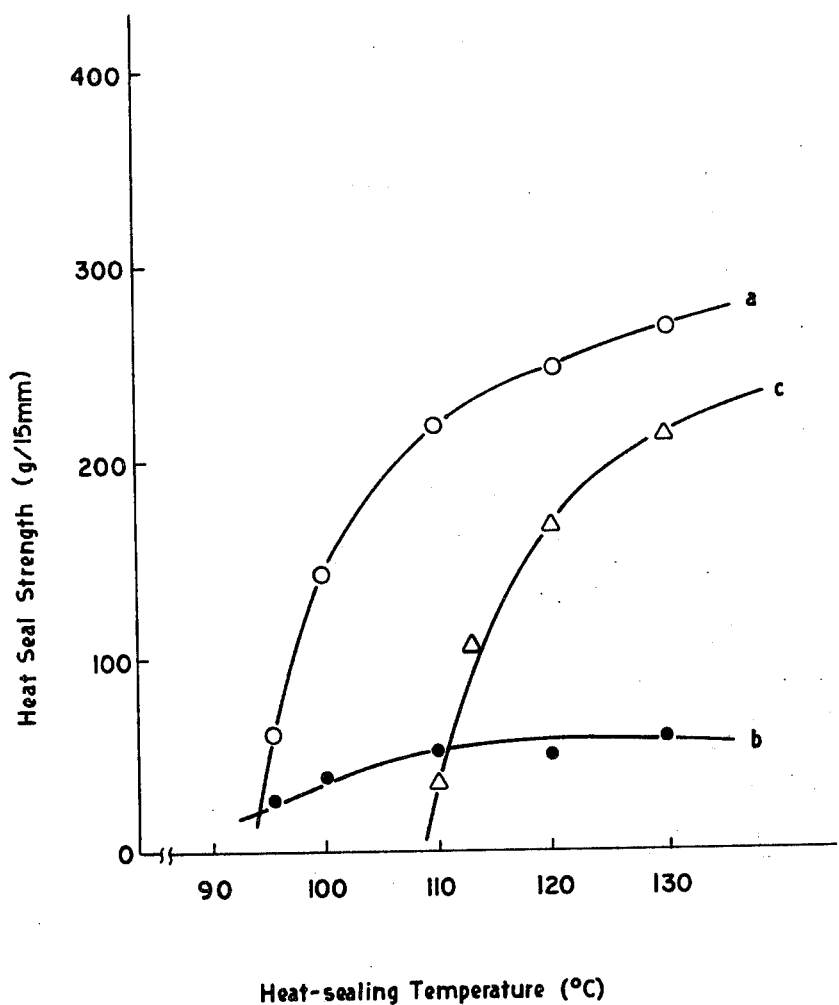

COATED POLYOLEFIN FILM

BACKGROUND OF INVENTION

1. Field of Invention

The present invention relates to a polyolefin film is coated with an undercoat consisting essentially of a mixture of (a) polyvinylidene chloride or a copolymer thereof containing at least 88 percent by weight of vinylidene chloride monomer units and (b) a chlorinated polypropylene or a graft polymer thereof at the weight ratio of a/b in the range between 99/1 and 90/10, and a topcoat consisting essentially of a vinylidene chloride copolymer containing not more than 88 percent by weight of vinylidene chloride monomer units. More particularly, the invention relates to coated polyolefin films which are excellent in the low-temperature heat-sealing property, the barrier property to oxygen gas and water vapor, the adhesive cellophane tape peel strength of the coating and the transparency.

2. Description of Prior Arts

Biaxially stretched films of isotactic polypropylene now attract attention in the art because of their high mechanical properties and excellent transparency. However, these films are inferior in the oxygen gas barrier property and since they are highly crystalline and are biaxially stretched, thermal shrinkage is caused at high temperatures and the heat-sealing property is quite insufficient.

As means for improving the oxygen gas barrier property and the heat-sealing property, there has been proposed a process comprising coating such polypropylene film with a mixture of a vinylidene chloride type resin and a chlorinated polypropylene resin or a chlorinated polypropylene resin grafted with a vinyl monomer such as styrene (see Japanese Patent Publications Nos. 16316/68, 26085/68, 277/70 and 8400/72). In this method, however, films having a good heat-sealing property cannot be obtained, because a vinylidene chloride resin having a relatively high vinylidene chloride content is used in order to improve the oxygen gas barrier property.

As means for improving the low-temperature heat-sealing property, there have been adopted a method in which a vinylidene chloride type resin having a vinylidene chloride content reduced to some extent is employed and a method in which a third component having a low melting point is incorporated. According to these methods, a good low-temperature heat-sealing property can be attained, but the oxygen gas barrier property is insufficient.

SUMMARY OF INVENTION

In view of such state of the art we have made various research works and have now completed coated polyolefin films which are excellent in all of the foregoing properties. More specifically, in accordance with the present invention, there is provided a coated polyolefin film obtained by coating a polyolefin film with an undercoat liquid composition comprising as main components 99 to 90 parts by weight of a vinylidene chloride type resin containing at least 88% of vinylidene chloride and 1 to 10 parts by weight of a chlorinated polypropylene resin or an ethylenically unsaturated vinyl monomer-grafted chlorinated polypropylene resin, and coating the coated surface of the film with a topcoat liquid composition comprising as a main component a vinylidene chloride type resin containing vinylidene chloride in an amount of from 35 to 88% by weight, preferably from 50 to 85% by weight.

As the chlorinated polypropylene, a product obtained by chlorinating crystalline or non-crystalline polypropylene can be used in the present invention. It is preferred that the intrinsic viscosity of the starting polypropylene be in the range of 0.3 to 3.0 dl/g.

If the intrinsic viscosity of the starting polypropylene is lower than 0.3 dl/g, the film-forming property is bad and the heat seal strength of the coated polyolefin film is reduced. If the intrinsic viscosity is higher than 3.0 dl/g, the coating solution becomes too viscous and its adaptability to the coating operation is insufficient. Further, the heat seal strength of the coated polyolefin film tends to be reduced. An especially preferred intrinsic viscosity is in the range of 0.5 to 1.5 dl/g.

In the instant specification, the intrinsic viscosity is a value determined based on the viscosity of a dilution of a polymer in decalin as measured at 135° C., and at the concentration of from 0.2 to 0.5 wt %.

It is preferred that the chlorine content in the chlorinated polypropylene be in the range of 15 to 55% by weight. If the chlorine content is lower than 15% by weight, the solubility in an organic solvent and the compatibility with a vinylidene chloride type resin are insufficient. If the chlorine content is higher than 55% by weight, the thermal stability is reduced and the heat seal strength of the coated polyolefin film is degraded.

Chlorinated polypropylene can be prepared by chlorinating polypropylene in the solution state, the suspension state or the solid dispersion state according to customary procedures. These methods are described, for example, in J. Polymer Sci., 55, 169 (1961) and Kobunshi, 9, 903 (1960).

As the ethylenically unsaturated vinyl monomer-grafted chlorinated polypropylene (hereinafter referred to merely as "grafted polymer"), there is preferably employed a product obtained by grafting a vinyl monomer in an amount of 2 to 30% by weight (based on the grafted polymer) to a chlorinated polypropylene having a chlorine content of 15 to 55% by weight, which is obtained by chlorinating polypropylene having an intrinsic viscosity of 0.3 to 3 dl/g.

Graft polymerization of monomers to chlorinated polypropylenes can be performed, for example, according to a method disclosed in Kokashi, 64, 172 (1961).

Any of emulsion polymerization, suspension polymerization and solution polymerization systems may be adopted for this graft polymerization. In view of the homogeneous grafting effect, the solution polymerization system is most preferred. Any of solvents capable of dissolving therein chlorinated polypopylene can be used as the solvent for the graft polymerization. Aromatic hydrocarbons such as benzene and toluene and chlorinated hydrocarbons such as carbon tetrachloride and chloroform are especially preferred.

Various catalysts may be used for the graft polymerization. For example, these may be employed known radical polymerization catalysts such as peroxides, azo compounds and persulfates, and redox catalysts comprising a radical polymerization catalyst as mentioned above and a reducing agent such as ascorbic acid, formaldehyde or sodium sulfoxylate. Further, recently proposed metal chelate compounds, for example, chelates of 1,3-dicarbonyl compounds with transition metals of the groups I and VI to VIII of the Periodic Table, may be used as the graft polymerization catalyst. Recently, it was reported that a mixture of an activated metal and an organic halogen compound has a polymerization-initiating activity [for example, Polymer Letters, 5, 697 (1967)]. We noted that chlorinated polypropylene has a carbon-to-chlorine linkage, and we made investigations on the combination of chlorinated polypropylene and an activated metal. As a result, it was found that activated metals are able to cause graft polymerization of chlorinated polypropylene. Accordingly, activated metals such as reduced copper, iron, nickel and cobalt can be used as the graft polymerization initiator. The polymerization catalyst may be used in an amount of 0.1 to 5 mole % (based on the monomer), preferably 0.2 to 2 mole %. The activated metal is used in an amount of 0.5 to 15% by weight (based on the monomer), preferably 1 to 8% by weight.

The temperature and time for the grafting reaction may be changed in broad ranges, but in general, it is especially preferred that the grafting reaction be carried out at 20° to 100° C. for 1 to 24 hours. Needless to say, various chain transfer agents may be used for the grafting reaction.

As the vinyl monomer to be graft-polymerized, there can be mentioned, for example, styrene type monomers, vinyl chloride, vinylidene chloride, vinyl acetate, vinyl propionate, 1,3-butadiene, acrylonitrile, methacrylonitrile, acrolein, acrylates and methacrylates. It is preferred that the content of the grafted vinyl monomer in the grafted polymer be in the range of 2 to 30% by weight. If the grafted monomer content is lower than 2% by weight, no substantial effect can be obtained. If the grafted monomer content is higher than 30% by weight, the heat seal strength tends to be reduced.

Any of known vinylidene chloride resins can be used in the present invention. For example, there may be employed vinylidene chloride-acrylonitrile copolymers, vinylidene chloride-vinyl chloride copolymers, vinylidene chloride-vinyl acetate copolymers, vinylidene chloride-acrylate copolymers, vinylidene chloride-acrylic acid copolymers and products obtained by copolymerizing a third component such as acrylic acid, methacrylic acid or the like with the above-mentioned copolymers. Use of a vinylidene chloride homopolymer is not preferred, because no good results are obtained with respect to the thermal stability, the weatherability and the softness of the coating.

Crystalline polyolefin films, crystalline poly-4-methylpentene-1 films and the like can be used as the polyolefin film in the present invention. A biaxially stretched crystalline polypropylene film is especially preferred because it has a high melting point, a high transparency, a high mechanical properties and a high packaging adaptability.

It is known that in order to improve the adhesiveness at the coating step, various surface treatments may be applied to polyolefin films. Also in the present invention, these known surface treatments, for example, corona discharge, high frequency wave, flame and chromium-containing liquid treatments may be adopted, but it must be noted that one of characteristic features of the present invention is that very excellent results can be obtainted even if such pre-treatment is not conducted.

In the present invention, coating devices customarily used for the production of moisture-proof cellophanes, such as a dip coater, a roller coater and a gravure coater, can be used.

In the vinylidene chloride resin that is used for the undercoat liquid composition, the vinylidene chloride resin content is at least 88%. In view of the oxygen gas barrier property, it is preferred that the vinylidene chloride content be at least 90%.

In the undercoat liquid composition, the weight ratio of the vinylidene chloride resin to the chlorinated polypropylene or ethylenically unsaturated monomer-grafted chlorinated polypropylene is preferably in the range of 99/1 to 90/10, especially preferably in the range of 99/1 to 95/5. If this ratio is higher than 99/1, no substantial effect of improving the heat-sealing property is attained. If this ratio is lower than 90/10, the effect of improving the gas barrier property is reduced.

The undercoat liquid composition referred to in the instant specification includes a homogeneous solution formed by dissolving the vinylidene chloride type resin in a solvent for the resin or a mixture of a solvent for the resin and a non-solvent for the resin, and a heterogeneous liquid system formed by dispersing or emulsifying the vinylidene chloride type resin in a non-solvent such as water.

In the vinylidene chloride resin for the topcoat liquid composition, the vinylidene chloride content is from 35 to 88 wt %. In view of the low-temperature heat-sealing property, it is especially preferred that the vinylidene chloride content be from 50 to 85 wt %.

As is well-known in the art, additives such as antioxidants, dyes, pigments, lubricants, antistatic agents, blocking preventing agents and ultraviolet stabilizers may be incorporated into the coating composition.

The thickness of the coating layer is preferably in the range of 1 to 10μ, especially 2 to 5μ.

The coated film prepared according to the process of the present invention may be used as a wrapping material as it is or after it has been formed into a bag. Further, it may be laminated and used as a packaging material. More particularly, the film of the present invention is especially suitable for packaging snack foods such as cookies, crackers and potato chips, oily and fatty foods such as chocolates and sponge cakes, and fried rice cakes, dried lavers, sprinkling food additives, peanuts, tobaccos, cut tobaccos, roast coffee beans, handkerchiefs, gauzes, woven fabrics, soaps, detergents, dry cells and unfinished machine parts.

BRIEF DESCRIPTION OF DRAWING

The drawing illustrates the relation between the heat-sealing temperature and the heat seal strength in the coated polyolefin film.

The present invention will now be described in detail by reference to the following illustrative examples that by no means limit the scope of the invention.

In the examples, properties of coated films were tested according to the following methods.

(1) Adhesive cellophane tape test:

According to a method similar to the so-called Scotch Tape test, a pressure-sensitive adhesive cellophane tape having a size of 24 mm × 200 mm was applied to the resin-coated surface and the entire tape surface was pressed repeatedly to bond the tape tightly to the resin-coated surface. Then, the adhesive tape was violently peeled at an angle of 90°. The state of peeling of the coating was examined and the peel strength was evaluated according to the following scale:

Excellent: the resin coating was not peeled at all.
Good: the resin-peeled area was less than 10% of the total area.

Fair: the resin-peeled area was 10 to 20% of the total area.

Bad: the resin-peeled area was larger than 20% of the total area.

(2) Heat seal strength test:

Two coated films were superimposed so that the coated surfaces confronted each other, and they were heat-sealed at a heater temperature of 120° C. under a pressure of 2 Kg/cm$^2$ for 2 seconds by using a bar-type heat sealer. A sample having a size of 10 mm × 150 mm was taken out and the pulling peel strength of the heat-sealed area was tested at a pulling speed of 300 mm/min by using a Tensilon tester. When the relation between the heat-sealing temperature and the heat seal strength was examined, the heater temperature was changed in the above method.

(3) Water vapor permeability:

The water vapor permeability was tested at a temperature of 40° C. and a relative humidity of 90% by using a cup indicated in JIS Z-0208.

(4) Oxygen gas permeability:

The measurement was carried out at 20° C. by using oxygen gas having a humidity of 0% and helium gas according to the gas chromatograph test method using Lyssy Gas Permeability Testing Apparatus L-66.

(5) Transparency:

The transparency was evaluated with the naked eye according to the following scale:
  Excellent: equal to the transparency of a biaxially stretched polypropylene film.
  Good: slightly inferior to the transparency of a biaxially stretched polypropylene film.
  Fair: considerably inferior to the transparency of a biaxially stretched polypropylene film but slightly superior to that of low density polyethylene.
  Bad: equal or inferior to the transparency of low density polyethylene.

(6) Blocking resistance:

Several films having a size of 100 mm × 100 mm were inserted between two glass sheets, and they were allowed to stand still at 40° C. under compression of 0.5 Kg/cm$^2$ for 8 hours and then naturally cooled to room temperature.

The blocking resistance was evaluated according to the following scale:
  Excellent: the films could be separated into the respective films without application of a force.
  Good: the films could be separated under application of a small force.
  Fair: the films could be separated under application of a force but the coated resin layer was partially damaged.
  Bad: the films could not be separated without fracture of the films because the films were formed into a hard block.

EXAMPLE 1

The chlorinated polypropylene used in this example was prepared in the following manner.

According to a customary method, isotactic polypropylene having an intrinsic viscosity of 1.5 dl/g was dissolved in tetrachloroethylene at 120° C. and chlorine gas was blown in the solution to obtain a chlorinated polypropylene having a chlorine content of 30% by weight and an intrinsic viscosity of 1.2 dl/g.

The so obtained chlorinated polypropylene and a vinylidene chloride-vinyl chloride copolymer (having a vinylidene chloride content of 90%) were dissolved at a mixing ratio shown in Table 1 into a toluene: tetrahydrofuran mixed solvent (1 : 1 mixing weight ratio) to form an undercoat composition. The composition was coated by a Mayer bar on the surface of a biaxially stretched polypropylene film (20μ in thickness) that had been subjected to the corona discharge treatment to have a contact angle of 65° to water, and the coated surface was dried at 110° C. for 1 minute. In each case, the amount of the coating after drying was 2.1 to 2.5 g/m$^2$. Then, a topcoat composition (recipe A) described below, comprising as the main component a vinylidene chloride-acrylic acid ester copolymer emulsion (vinylidene chloride content = 85%), was coated on the undercoated surface by using a Mayer bar, and the coated film was dried for 1 minute in an oven maintained at 115° C. The total amount of the undercoat and topcoat was 4.5 to 5.1 g/m$^2$. In Table 1, Comparative Examples 1 to 3 were outside the scope of the present invention, and they are shown only for comparison. In Comparative Examples 2 and 3, the topcoat composition was prepared according to the recipe B described below.

| Topcoat Composition (Recipe A): | | |
|---|---|---|
| Vinylidene chloride/acrylic acid ester copolymer (85/15) emulsion | 97.9 | parts by weight |
| Wax emulsion (melting point of 65° C) | 2 | parts by weight |
| Calcium carbonate | 0.1 | part by weight |
| Topcoat Composition (Recipe B): | | |
| Vinylidene chloride/acrylic acid ester copolymer (90/10) emulsion | 97.9 | parts by weight |
| Wax emulsion (melting point of 65° C) | 2 | parts by weight |
| Calcium carbonate | 0.1 | part by weight |

Properties of the so obtained films are shown in Table 2.

Table 1

| | Undercoat Compositon | | |
|---|---|---|---|
| | Amount (parts by weight) of vinylidene chloride/ vinyl chloride copolymer | Amount (parts by weight) of chlorinated polypropylene | Topcoat Composition |
| Comparative Example 1 | 100 | 0 | Recipe A |
| Example 1-1 | 98 | 2 | Recipe A |
| Example 1-2 | 97 | 3 | Recipe A |
| Example 1-3 | 96 | 4 | Recipe A |
| Example 1-4 | 93 | 7 | Recipe A |
| Comparative Example 2 | 98 | 2 | Recipe B |
| Comparative Example 3 | 97 | 3 | Recipe B |

Table 2

| | Adhesive cellophane tape test | Heat seal strength (g/15 cm) | Water vapor permeability (g/m$^2$.24 hrs) | Oxygen gas permeability (cc/m$^2$.24 hrs) | Transparency |
|---|---|---|---|---|---|
| Comparative Example 1 | bad | 53 | 5.5 | 18 | excellent |
| Example 1-1 | excellent | 235 | 5.5 | 18 | excellent |

Table 2-continued

|  | Adhesive cellophane tape test | Heat seal strength (g/15 cm) | Water vapor permeability (g/m².24 hrs) | Oxygen gas permeability (cc/m².24 hrs) | Transparency |
|---|---|---|---|---|---|
| Example 1-2 | excellent | 247 | 6.0 | 16 | excellent |
| Example 1-3 | excellent | 255 | 5.0 | 21 | excellent |
| Example 1-4 | excellent | 233 | 5.5 | 26 | excellent |
| Comparative Example 2 | excellent | 180 | 5.5 | 17 | excellent |
| Comparative Example 3 | excellent | 172 | 5.0 | 18 | excellent |

The relation between the heat-sealing temperature and the heat seal strength, which was observed in Example 1-2 and Comparative Examples 1 and 3, was shown in the drawing, in which curves a, b and c illustrate results of Example 1-2, Comparative Example 1 and Comparative Example 3, respectively. From these results, it will readily be understood that the film of the present invention is much superior to comparative films with respect to the low-temperature heat-sealing property.

EXAMPLE 2

The grafted polymer used in this Example was prepared in the following manner.

In a 1-liter capacity autoclave, 100 g of the same chlorinated polypropylene as used in Example 1 was charged, and 500 g of toluene was added and the mixture was sufficiently agitated to form a solution. Then, 50 g of vinyl chloride and 3.5 g of benzoyl peroxide were added to the solution and the temperature was elevated to 60° C. The reaction was conducted for 10 hours in an oxygen-free atmosphere, and the reaction at product was purified by a re-precipitation to obtain 115 g of a polymer.

When the vinyl chloride content in this polymer was calculated from the results of the nuclear magnetic resonance spectrum analysis, it was found that the vinyl chloride content was 13.8%.

By utilizing the fact that chlorinated polypropylene is soluble in carbon tetrachloride and polyvinyl chloride is hardly soluble in carbon tetrachloride, the resulting polymer was disslved in carbon tetrachloride, and the insoluble substance was removed by filtration and the purified polymer was recovered by re-precipitation. In the purified polymer, the vinyl chloride content was 12.4%, and it was estimated that the majority of vinyl chloride contained in the purified polymer was bonded to the chlorinated polypropylene in the stage grafted thereto.

The grafted polymer prepared by the above-mentioned method and the same vinylidene chloride-vinyl chloride copolymer (vinylidene chloride content = 90%) as used for the undercoat composition in Example 1 was dissolved at a mixing ratio indicated in Table 3 in a toluene/tetrahydrofuran mixed solvent (1/1 weight ratio) to form an undercoat composition. The composition was coated by a Mayer bar on the surfaces of a biaxially stretched polypropylene film (thickness = 20μ) which had been subjected to the corona discharge treatment to have a contact angle of 65° to water (Example 2-1) and a biaxially stretched polypropylene film (thickness = 20μ) which had not been subjected to the corona discharge treatment and had a contact angle of 90° to water (Example 2-2), and the coated surfaces were dried at 110° C. for 1 minute. The amount of the coating after drying was 2.2 to 2.3 g/m² in each case. Then, a topcoat composition (recipe A) was coated on each undercoated surface by a Mayer bar. The coated films were dried for 1 minute in an oven maintained at 115° C. The total amount of the undercoat and topcoat after drying was 5.3 to 5.4 g/m².

Properties of the so obtained coated films are shown in Table 4.

Table 3

| | | Undercoat Composition | | |
|---|---|---|---|---|
| Ex. No. | Corona Discharge Treatment | Content (parts by weight) of vinylidene chloride-vinyl chloride copolymer (90/10) | Content (parts by weight) of grafted polymer | Topcoat Composition |
| 2-1 | effected | 97 | 3 | Recipe A |
| 2-2 | not effected | 97 | 3 | Recipe A |

Table 4

| | Example 2-1 | Example 2-2 |
|---|---|---|
| Corona discharge treatment | effected | not effected |
| Adhesive cellophane tape test | excellent | excellent |
| Heat seal strength (g/15 mm) | 237 | 219 |
| Water vapor permeability (g/m².24 hrs) | 5.5 | 5.5 |
| Oxygen gas permeability (cc/m². 24 hrs) | 19 | 17 |
| Transparency | excellent | excellent |

EXAMPLE 3

The same undercoat composition and topcoat composition (recipe A) as used in Example 2 were coated on the same biaxially stretched film (subjected to the corona discharge treatment and having a thickness of 20μ) as used in Example 2-1, while changing the amounts coated of the compositions as indicated in Tables 5-1 and 5-2. Properties of the resulting coated films are shown in Tables 5-1 and 5-2.

Table 5-1

| | | (amount of topcoat was changed) | | | | | |
|---|---|---|---|---|---|---|---|
| Example No. | Amount (g/m²) of Undercoat | Amount (g/m²) of Undercoat and Topcoat | Adhesive Cellophane Tape Test | Heat Seal Strength (g/15 mm) | Water Vapor Permeability (g/m².24 hrs) | Oxygen Gas Permeability (cc/m².24 hrs) | Transparency |
| 3 - 1 | 2.3 | 4.5 | excellent | 193 | 6 | 21 | excellent |
| 3 - 2 | 2.0 | 6.8 | excellent | 248 | 5.5 | 16 | excellent |
| 3 - 3 | 2.2 | 9.1 | excellent | 275 | 5 | 13 | excellent |
| 3 - 4 | 2.2 | 11.3 | excellent | 307 | 5 | 10 | good |

Table 5-2

(amount of undercoat was changed)

| Example No. | Amount (g/m²) of Undercoat | Amount (g/m²) of Undercoat and Topcoat | Adhesive Cellophane Tape Test | Heat Seal Strength (g/15 mm) | Water Vapor Permeability (g/m².24 hrs) | Oxygen Gas Permeability (cc/m².24 hrs) | Transparency |
|---|---|---|---|---|---|---|---|
| 3 - 5 | 2.2 | 4.3 | excellent | 186 | 5.5 | 18 | excellent |
| 3 - 6 | 2.7 | 4.9 | excellent | 203 | 5.5 | 16 | excellent |
| 3 - 7 | 3.5 | 5.9 | excellent | 244 | 5 | 13 | excellent |
| 3 - 8 | 4.8 | 7.1 | excellent | 267 | 5 | 9 | excellent |

EXAMPLE 4

The same undercoat composition as used in Example 2 was coated by a Mayer bar on the surface of a biaxially stretched film (thickness = 20μ) which had been subjected to the corona discharge treatment to have a contact angle of 65° to water, and the coated surface was dried at 110° C. for 1 minute. Then, a topcoat composition (having recipe C indicated below) in the state dissolved in methylethyl ketone was coated on the undercoated surface by a Mayer bar, and the coated film was dried for 1 minute in an oven maintained at 110° C.

| Topcoat Composition (recipe C): | | |
|---|---|---|
| Vinylidene chloride/vinyl chloride/ acrylic acid ester copolymer (30/50/20) | 97.9 | parts by weight |
| Wax (melting point = 60° C) | 2 | parts by weight |
| Calcium carbonate | 0.1 | part by weight |

Properties of the so obtained coated films are shown in Table 6.

was elevated to 70° C. and the reaction was carried out in a nitrogen atmosphere for an appropriate time. The product was purified by re-precipitation. By using a calibration curve prepared from an infrared absorption spectrum of a blend of chlorinated polypropylene and polystyrene, the styrene content in each of the resulting polymers was calculated. It was found that the styrene content was 3.5, 7.8, 14.6 or 20.5%.

It was construed that the majority of the polymerized styrene was bonded to the chlorinated polypropylene in the state grafted thereto.

Each of the so obtained grafted polymers and a vinylidene chloride/acrylonitrile copolymer (vinylidene chloride content = 90%) were dissolved at a mixing ratio indicated in Table 7 in a tetrahydrofuran/toluene mixed solvent (1/1 weight ratio) to form an undercoat composition. The undercoat composition was coated by a Mayer bar on the surface of a biaxially stretched polypropylene film (having a thickness of 20μ) which had been subjected to the corona discharge treatment, and the coated surface was dried at 110° C. for 1 minute. The amount of the undercoat after drying was 2.1 to 2.4 g/m². Then, a topcoat composition (recipe D indicated Table 6

| Example No. | Amount (g/m²) of Undercoat | Amount (g/m²) of Undercoat and Topcoat | Adhesive Cellophane Tape Test | Heat Seal Strength (g/15 mm) | Water Vapor Permeability (g/m².24 hrs) | Oxygen Gas Permeability (g/m².24 hrs) | Transparency |
|---|---|---|---|---|---|---|---|
| 4 - 1 | 1.9 | 4.5 | excellent | 212 | 6.5 | 27 | excellent |
| 4 - 2 | 2.2 | 6.3 | excellent | 295 | 6 | 25 | excellent |

EXAMPLE 5

The styrene-grafted chlorinated polypropylene used in this Example was prepared in the following manner.

According to a customary method, isotactic polypropylene having an intrinsic viscosity of 1.0 d/dl was dissolved in tetrachloroethylene at 120° C. and chlorine was blown in the solution to obtain a chlorinated polypropylene having a chlorine content of 30% by weight and an intrinsic viscosity of 0.8 dl/g. A 1-liter capacity polymerization vessel was charged with 120 g of the so obtained chlorinated polypropylene, 0.7 l of benzene and 120 g of styrene and the mixture was sufficiently agitated to form a solution. Then, 2.8 g of benzoyl peroxide was added to the solution, and the temperature below) was coated on the undercoated surface by a Mayer bar and the coated film was dried at 115° C. for 1 minute in an oven. The total amount of the undercoat and topcoat after drying was 4.6 to 5.1 g/m².

| Topcoat Composition (Recipe D) | | |
|---|---|---|
| Vinylidene chloride/vinyl chloride/ acrylic acid ester copolymer (84/10/6) | 97.9 | parts by weight |
| Wax (melting point = 60° C) | 2 | parts by weight |
| Calcium carbonate | 0.1 | part by weight |

Properties of the so obtained coated films are shown in Table 8.

Table 7

| | Undercoat Composition | | | |
|---|---|---|---|---|
| Example No. | Vinylidene chloride/ acrylonitrile copolymer (90/10) (parts by weight) | Grafted polymer (parts by weight) | Styrene content (% by weight) in grafted polymer | Topcoat Composition |
| 5 - 1 | 97 | 3 | 3.5 | Recipe D |
| 5 - 2 | 97 | 3 | 7.8 | Recipe D |
| 5 - 3 | 97 | 3 | 14.6 | Recipe D |
| 5 - 4 | 97 | 3 | 20.5 | Recipe D |

Table 8

| Example No. | Adhesive Cellophane Tape Test | Heat Seal Strength (g/15 mm) | Water Vapor Permeability (g/m².24 hrs) | Oxygen gas Permeability (cc/m².24 hrs) | Transparency |
| --- | --- | --- | --- | --- | --- |
| 5 - 1 | excellent | 243 | 6.0 | 17 | excellent |
| 5 - 2 | excellent | 272 | 5.5 | 17 | excellent |
| 5 - 3 | excellent | 221 | 5.5 | 16 | excellent |
| 5 - 4 | excellent | 233 | 6.0 | 18 | excellent |

EXAMPLE 6

The grafted polymer used in this Example was prepared in the following manner.

Isotactic polypropylene having an intrinsic viscosity of 1.0 l/g was dissolved in tetrachloroethylene at 120° C. and chlorine gas was blown in the solution to effect chlorination, chlorinated polypropylenes having chlorine contents of 18, 25 and 40% by weight, respectively, were obtained by changing the chlorination time. Grafted polymers were prepared from these polymers in the same manner as in Example 5. The styrene contents were 11.0%, 10.2% and 10.6%, respectively.

Each of the so obtained grafted polymers and the same vinylidene chloride/acrylonitrile copolymer as used for the undercoat composition in Example 5 were dissolved at a mixing ratio indicated in Table 9 into a tetrahydrofuran/toluene mixed solvent (1 : 1 weight ratio) to form an undercoat composition. The composition was coated by a Mayer bar on the surface of a biaxially stretched polypropylene film (thickness = 20μ) which had been subjected to the corona discharge treatment, and the coated surface was dried at 110° C. for 1 minute. The amount of the undercoat after drying was 2.3 to 2.6 g/m². Then, in the same manner as in Example 5, the topcoat composition (recipe A) was coated on the undercoated surface, and the coated surface was dried. The total amount of the undercoat and topcoat was 4.5 to 5.3 g/m². In Examples 6-4 to 6-6, the non-grafted chlorinated polypropylene was used. Properties of the resulting films are shown in Table 10.

Table 9

| Example No. | Undercoat Composition | | | | Topcoat Composition |
| --- | --- | --- | --- | --- | --- |
| | Vinylidene chloride/ acrylonitrile copolymer (90/10) (parts by weight) | Grafted polymer or chlorinated polypropylene (parts by weight) | Chlorine content (% by weight) in grafted polymer or non-grafted polymer | Styrene content (% by weight) in grafted polymer | |
| 6 - 1 | 97 | 3 | 18 | 11.0 | Recipe A |
| 6 - 2 | 97 | 3 | 25 | 10.2 | Recipe A |
| 6 - 3 | 97 | 3 | 40 | 10.6 | Recipe A |
| 6 - 4 | 97 | 3 | 18 | 0 | Recipe A |
| 6 - 5 | 97 | 3 | 25 | 0 | Recipe A |
| 6 - 6 | 97 | 3 | 40 | 0 | Recipe A |

Table 10

| Example No. | Adhesive Cellophane Tape Test | Heat Seal Strength (g/15 mm) | Water Vapor Permeability (g/m².24 hrs) | Oxygen Gas Permeability (cc/m². 24 hrs) | Transparency |
| --- | --- | --- | --- | --- | --- |
| 6 - 1 | excellent | 223 | 6.5 | 17 | excellent |
| 6 - 2 | excellent | 238 | 5.5 | 18 | excellent |
| 6 - 3 | excellent | 214 | 5.5 | 17 | excellent |
| 6 - 4 | excellent | 193 | 5.0 | 21 | excellent |
| 6 - 5 | excellent | 181 | 6.0 | 16 | excellent |
| 6 - 6 | excellent | 187 | 6.0 | 18 | excellent |

The embodiments of the invention in which an exclusive property or privilege is claimed are defined as follows:

1. A polyolefin film coated with
   I. an undercoat consisting essentially of a mixture of
   (a) polyvinylidene chloride or vinylidene chloride copolymer containing at least 88 weight percent of vinylidene chloride monomer units, and
   (b) a chlorinated polypropylene having a chlorine content of from 15 to 55 percent by weight and an intrinsic viscosity of from 0.3 to 3.0 dl/g, wherein intrinsic viscosity is determined by measuring the viscosity of a solution of 0.2 to 0.5 percent by weight of said chlorinated polypropylene in decalin at 135° C., or a graft polymer of said chlorinated polypropylene having grafted thereto from 2 to 30 percent by weight, based on the weight of the graft polymer, of an ethylenically unsaturated vinyl monomer,
   wherein the weight ratio of a/b is from 99/1 to 90/10, and
   II. a top coat consisting essentially of a vinylidene chloride copolymer containing from 35 to 88 weight percent of vinylidene chloride monomer units.

2. A coated film as claimed in claim 1, wherein the substrate film is selected from the group consisting of polypropylene and poly-4-methylpentene-1.

3. A coated film as claimed in claim 1 wherein the intrinsic viscosity of said chlorinated polypropylene is from 0.5 to 1.5 dl/g.

4. A coated film as claimed in claim 1 wherein the substrate film is a biaxially stretched polypropylene film.

5. A coated film as claimed in claim 1 wherein the combined thickness of the undercoat and the topcoat is from 1 to 10 microns.

6. A coated film as claimed in claim 1 wherein the weight ratio of a/b is from 99/1 to 95/5.

7. A coated film as claimed in claim 6 wherein said top coat consists essentially of a vinylidene chloride copolymer containing from 50 to 85 weight percent of vinylidene chloride monomer units.

8. A coated film as claimed in claim 7 wherein the vinylidene chloride copolymer in component (a) consists essentially of vinylidene chloride copolymer containing at least 90 weight percent of vinylidene chloride monomer units.

9. A coated film as claimed in claim 6 wherein said top coat consists essentially of a vinylidene chloride copolymer containing about 85 weight percent of vinylidene chloride monomer units and the vinylidene chloride copolymer in component (a) contains at least 90 weight percent of vinylidene chloride monomer units.

* * * * *